United States Patent [19]

Matsusaka

[11] 4,393,088

[45] Jul. 12, 1983

[54] STERILIZING PROCESS FOR FOODS BY APPLYING MICROWAVES THERETO

[75] Inventor: Osamu Matsusaka, Yokohama, Japan

[73] Assignee: Mitsubishi Monsanto Chemical Company, Kanagawa, Japan

[21] Appl. No.: 187,621

[22] Filed: Sep. 15, 1980

[30] Foreign Application Priority Data

Sep. 26, 1979 [JP] Japan ............................ 54-123660

[51] Int. Cl.$^3$ ................ A23L 3/10; B65B 55/16
[52] U.S. Cl. ..................... 426/234; 426/412;
53/425; 53/440; 422/21
[58] Field of Search ............ 426/412, 234, 402, 404;
53/425, 440; 422/21

[56] References Cited

U.S. PATENT DOCUMENTS

| | | | |
|---|---|---|---|
| 2,339,896 | 1/1944 | Waters | 426/410 |
| 2,369,765 | 2/1945 | Waters | 426/412 |
| 2,380,134 | 7/1945 | Waters | 426/412 |
| 2,401,131 | 5/1946 | Bensel | 426/234 |
| 2,411,896 | 12/1946 | Richmond et al. | 406/402 |
| 3,132,029 | 5/1964 | Beck | 426/412 |
| 3,215,539 | 11/1965 | Landy | 426/234 |
| 3,261,140 | 7/1966 | Long et al. | 426/234 |
| 3,552,982 | 1/1971 | Savidge | 426/412 |
| 3,676,058 | 7/1972 | Gray | 426/234 |
| 3,809,845 | 4/1974 | Stenstrom | 426/234 |
| 3,889,009 | 6/1975 | Lipoma | 426/234 |
| 3,892,058 | 7/1975 | Komatsu et al. | 426/412 |
| 3,961,569 | 6/1976 | Kenyon et al. | 426/234 |
| 4,081,942 | 4/1978 | Johnson | 426/412 |
| 4,122,197 | 10/1978 | Krugmann | 53/432 |
| 4,148,933 | 4/1979 | Janovtchik | 426/402 |
| 4,291,085 | 9/1981 | Ito et al. | 426/412 |

*Primary Examiner*—Steven L. Weinstein
*Attorney, Agent, or Firm*—Burgess, Ryan and Wayne

[57] ABSTRACT

A food consisting of a solid food material and a liquid material is sterilized within a short time by placing a solid food material into a container capable of transmitting microwaves; feeding a hot liquid material having a higher temperature than that of the solid food material into the container; hermetically sealing the container, and; applying microwaves to the container to sterilize the content in the sealed container.

7 Claims, No Drawings

STERILIZING PROCESS FOR FOODS BY APPLYING MICROWAVES THERETO

FIELD OF THE INVENTION

The present invention relates to a sterilizing process for foods by applying microwaves thereto. More particularly, the present invention relates to a sterilizing process for foods consisting of a solid food material and a liquid material, by applying microwaves thereto for a short time, without degrading the taste and flavor of said foods.

BACKGROUND OF THE INVENTION

Recently, not only various new types of foods but also various new types of containers for the foods have been created. Therefore, now various types of foods contained in various types of containers are commercially available.

In the preparation of a food contained in a container, the food is sterilized before, during or after the container is filled with the food. The sterilizing procedure is usually carried out by heating the food at an elevated temperature over a considerably long period of time. This heating operation when applied to the food, sometimes causes the food per se to be spoiled, or adversely affects the taste and flavor of the food.

In order to eliminate the disadvantages of the above-mentioned heat-sterilizing method, it has been attempted to heat the food contained in the container at an extremely high temperature of, for example, 120° to 140° C., for a short time of several minutes by, for example, a so-called retort sterilizing method. This method is effective for shortening the time in which the food is exposed to the extremely high temperature. However, since the container which contains therein the food is also exposed to the extremely high temperature, it is necessary that the container per se be made of a thermally resistant material which is stable at the extremely high temperature. Usual paper and thermoplastic polymer materials are not suitable for the container due to the unsatisfactory thermal resistance thereof.

Also, it is known that microwaves are effective for sterilizing various foods. This sterilizing procedure can be effected at a relatively low temperature of 70° to 105° C. within a relatively short time of 90 to 180 seconds.

In the case where a food contained in a vessel is placed in a microwave-irradiating apparatus and microwaves are applied to the food to sterilize it, various volatile substances in the food are undesirably evaporated from the food. This evaporation of the volatile substances frequently causes the taste and flavor of the food to be changed.

In the case where a container capable of transmitting microwaves therethrough is filled with a food and, then, hermetically sealed, and thereafter, microwaves are applied to the food through the container, the evaporation of the volatile substances from the food can be prevented. However, in this case, the elevation in the temperature of the food results in expansion of the food. This expansion creates a large pressure in the container. Due to the expansion pressure created in the container, the container per se is bulged out and, sometimes, ruptures.

In order to prevent the rupture of the container, Japanese Patent Application Laying-open (Kokai) No. 52-68785 discloses a process in which a closed container containing a food material is placed in a hermetically closed box which is provided with an apparatus for emitting microwaves, and while the microwaves are applied to the container, the pressure in the closed box is controlled so as to equilibrate with the pressure in the container.

This process requires a special apparatus which causes the cost of the sterilizing procedure to be too high. Also, the process is very complicated and costly.

Under the above-mentioned circumstances, it has been recognized that an industrial application of the microwave sterilizing method to the food contained in a hermetically sealed container is very difficult and not practical.

SUMMARY OF THE INVENTION

An object of the present invention is to provide a sterilizing process for foods by applying microwaves thereto, which process can be industrially used without any difficulty.

Another object of the present invention is to provide a sterilizing process for foods by applying microwaves thereto, which process is effective for sterilizing food containing volatile substances without evaporating the volatile substances from the food.

A further object of the present invention is to provide a sterilizing process for foods by applying microwaves thereto, which process does not deteriorate the taste and flavor of the food, and spoil the food.

The above-mentioned objects can be attained by the process of the present invention which comprises the steps of:

placing a solid food material into a container which is capable of transmitting microwaves therethrough;

feeding a liquid material having an elevated temperature higher than that of the solid food material into the container;

hermetically sealing the container, and;

applying microwaves to the container to sterilize the mixture of the solid food material and the liquid material in the sealed container.

DETAILED DESCRIPTION OF THE INVENTION

In the process of the present invention, microwaves are applied to a mixture of a solid food material and a liquid material contained in a hermetically closed container, through the container. Therefore, it is necessary that the container per se be capable of transmitting the microwaves therethrough. The container may be made of at least one material, which is microwave-transmissible, selected from, for example, paper, thermoplastic polymer materials such as polyethylene, polypropylene, polystyrene, polycarbonate, polyacetal, acrylic resins, polyamides and polyesters and glass. However, it is necessary for the container to be highly resistive to rupture thereof, even in the case where a raised pressure is generated in the container. Therefore, the container is preferably made from a lamination of at least two members selected from paper sheets and thermoplastic polymer films. The container may be reinforced with a frame structure made of a microwave-transmissible plastic polymer material. Examples of the containers with the reinforcing frame structure which are useful for the present invention are disclosed in British Pat. No. 1,348,370.

In the process of the present invention, the solid food material may be a fruit, vegetable, meat, fish and a mixture of two or more of the above-mentioned materials. The solid food material usually contains a considerable amount of a liquid component preferably in an amount of 50% by weight or more.

The liquid component is effective for promoting the generation of heat in the solid food material when the microwaves are applied thereto. The rate of generating heat increases with as the content of the liquid component in the solid food material increases.

The solid food material in a predetermined amount is placed into the microwave-transmissible container through an opening of the container. While being placed in the container, the solid food material may have a temperature equivalent to the ambient temperature. Otherwise, the solid food material may be heated to a predetermined temperature higher than the ambient temperature.

Next, a liquid material is fed into the container through the opening thereof so that the container is completely filled with a mixture of the solid food material and the liquid material, so that substantially no air is contained in the container. While being fed into the container, the liquid material has an elevated temperature higher than that of the solid food material. Accordingly, after the liquid material is fed into the container, a portion of the heat of the liquid material is gradually transmitted to the solid food material until the temperature of the solid food material becomes equal to that of the liquid material. The transferring rate of the heat from the liquid material to the solid food material decreases with an increase in the content of the liquid content in the solid food material. Therefore, in the case where the solid food material contains a large amount of the liquid component, the transfer of heat from the liquid material to the solid food material is carried out gradually.

The liquid material may contain at least one member selected from water, oils and aqueous solutions of seasoning compositions.

The feeding procedure for the liquid material is immediately followed by a sealing procedure for the container. Usually, in the sealing procedure, the opening of the container, which container has been completely filled with the mixture of the solid food material and the liquid material, is hermetically closed with a sealing material before the mixture reaches an equilibrium temperature thereof.

It should be noted that the decrease in the temperature of the liquid material results in a decrease in the volume of the liquid material. Also, it should be noted that the higher the temperature of the liquid material, the higher the degree of transmission of microwaves through the liquid material. Accordingly, after the sealing procedure for the container is completed, the entire volume of the mixture of the solid food material and the liquid material becomes smaller than that just after the liquid material is fed into the container. This decrease in the volume of the mixture results in the generation of a reduced pressure in the sealed container. Also, since the liquid material has been heated to an elevated temperature, the microwaves applied to the container can easily reach the solid food material so as to rapidly heat it.

The container filled with the mixture of the solid food material and the liquid material is subjected to a microwave-sterilizing procedure. It is preferable that the microwave-sterilizing procedure is applied to the container before temperature of the solid food material reaches equilibrated with that of the liquid material.

This is because the generation of heat in a solid material having a low temperature by the application of microwaves thereto is larger than that in a liquid material having a temperature higher than that of the solid material. Therefore, the lower the temperature of the solid food material, the higher the heating effect for the solid food material.

In the process of the present invention, it is important that the container be hermetically closed as soon as possible after the feeding procedure for the liquid material is completed. This prompt closing operation is effective for generating a reduced pressure in the container due to the transfer of heat from the liquid material to the solid food material.

The sterilizing procedure for the mixture of the solid food material and the liquid material is carried out by applying microwaves to the mixture through the container. In this sterilizing procedure, since the container is hermetically sealed, the undesirable evaporation loss of the volatile substances in the mixture and heat loss are avoided. Also, the above-mentioned reduced pressure generated in the container before the application of the microwaves, is effective for preventing the undesirable deformation and rupture of the container due to the expansion of the mixture in the container.

In order to prevent the deformation or rupture of the container, it is preferable that the temperature of the liquid material to be fed into the container is at least 70° C., more preferably, from 80° to 110° C., above the temperature of the solid food material contained in the container. Also, it is preferable that the temperature of the liquid material to be fed into the container be as close as possible to a temperature to which the mixture is heated by the application of the microwaves thereto.

In the sterilizing procedure in the process of the present invention, microwaves having a frequency of from 900 to 10,000 MH$_z$ can be used. Usually, it is allowable to use microwaves having frequencies of 915, 2,450 and 5,800 MH$_z$ for purposes other than communication and detection. For the purpose of sterilization, microwaves having frequencies of 915 and 2,450 MH$_z$ are usually utilized.

When the microwaves are applied to the mixture of the solid food material and the liquid material through the container, the energy of the microwaves is absorbed by the mixture and converted into heat. That is, a heat is generated in the mixture so as to elevate the temperature of the mixture. Generally, the quantity of heat (P) generated by the application of microwaves to a dielectric can be calculated in accordance with the equation (I):

$$P(\text{Watt/m}^3) = 5/9 f \cdot E^2 \cdot \epsilon \gamma \tan \delta \times 10^{-10} \quad (I)$$

wherein f represents a frequency (H$_z$) of the microwaves, E represents an intensity (V/m) of the microwaves (electric field intensity), $\epsilon\gamma$ represents a specific inductive capacity of the dielectric and tan $\delta$ represents a dielectric power factor of the dielectric.

From the equation (I), it is clear that the quantity (P) of heat generated in the dielectric increases with an increase in the electric field intensity (E) of the microwaves applied to the dielectric and, also, with an increase in the frequency (f) of the microwaves applied to the dielectric. Further, it is clear that the larger the specific inductive capacity ($\epsilon\gamma$) and the dielectric power factor (tan $\delta$) of the dielectric, the higher the efficiency of absorbing the microwave energy by the dielectric.

In the process of the present invention, the dielectric to which the microwaves are applied is a mixture of the solid food material, which may contain a liquid component, and the liquid material. This type of dielectric exhibits a large dielectric loss factor which corresponds to a product of the specific inductive capacity with the dielectric power factor, that is, $\epsilon\gamma \times \tan\delta$. Therefore, it is easy to heat the mixture by applying the microwaves thereto.

The application of the microwaves to the mixture is carried out to such an extent that the temperature of the mixture in the container can reach a desired value at which the mixture is satisfactorily sterilized. The desired sterilizing temperature is variable depending on the kind of microorganisms contained in the mixture. Accordingly, the sterilizing temperature is usually in a range of from 70° to 105° C. It is preferable that the sterilizing time be as short as possible, as long as the mixture in the container can be satisfactorily sterilized at the predetermined temperature. The necessary sterilizing time is variable depending on the kind of microorganism in the mixture and the sterilizing temperature. However, it is possible to preliminarily determine the necessary time for satisfactorily sterilizing a mixture, by carrying out a preliminary experiment for the sterilizing procedure.

After the application of the microwaves is completed, the mixture in the container is cooled to room temperature. The cooling procedure is preferably carried out as rapidly as possible.

The process of the present invention is industrially useful for sterilizing various foods, due to the following advantages thereof.

1. In the process of the present invention, a solid food material is placed in a container and mixed with a liquid material having a temperature higher than that of the solid food material; the container is hermetically closed, and; a portion of heat of the liquid material transfers to the solid food material before the microwaves are applied to the mixture, so as to form a reduced pressure in the closed container. Therefore, even when the mixture is heated by the application of the microwaves and the mixture expands in the container, the container is prevented from deformation and rupture thereof.

2. In the process of the present invention, the mixture of the solid food material and the liquid material has a considerably elevated temperature before the application of the microwaves thereto. Therefore, the mixture can reach the necessary sterilizing temperature within a short time. Accordingly, the heating time necessary for completing the sterilizing procedure is significantly shorter than that of the conventional microwave-setrilizing procedure in which a liquid material which has not been heated to an elevated temperature is used. The short heating time is effective for preventing a change in taste and flavor of the product.

The specific example presented below will serve to more fully elaborate how the process of the present invention is practiced. However, it should be understood that the example is only illustrative and in no way limits the scope of the present invention.

EXAMPLE

A cylindrical container, which had a bottom and a side wall each made of a lamination composed of a polyethylene layer having a weight of 18 g/m², a paper layer having a weight of 250 g/m², a polyethylene layer having a weight of 36 g/m², a partially saponified ethylene-vinyl acetate copolymer layer having a weight of 20 g/m² and a polyethylene layer having a weight of 37 g/m², was used. The container was provided with an open flange located on the top end of the container. The container was reinforced with a frame structure consisting of a bottom rib located on the inside surface of the bottom, an upper rib arranged on the inside surface of the flange and two side wall ribs which were located on the inside surface of the side wall and through which the bottom rib was connected to the upper rib. The container had a capacity of 250 ml.

The container was charged with four pieces of cut potato having a water content of about 75% by weight and a temperature of about 20° C. Each piece of the potato was in the form of a cube having a side length of 15 mm. The total weight of the four pieces was about 36.1 g.

Next, 165 ml of hot water having a temperature of 90° C. was fed into the container. Just after the water feeding procedure was completed, the flange of the container was closed with a transparent lid made of a lamination composed of a polyethylene layer having a weight of 37 g/m², a partially saponified ethylene-vinyl acetate copolymer layer having a weight of 20 g/m² and a biaxially oriented polystyrene layer having a weight of 104 g/m² and, then, hermetically sealed by applying a supersonic welding procedure to the lid.

The sealed container was placed in a dielectric cooking oven. At this point, the temperature of the hot water in the container was 77° C. and the temperature of the center portion of each potato piece in the container was 73° C.

Microwaves having a frequency of 2450 MH$_z$ were applied to the container for 90 seconds in the dielectric cooking oven. By this procedure, the temperatures of the hot water and the center portion of each potato piece were raised to 93° C. and 92° C., respectively. The container was allowed to stand at the above-mentioned temperatures for 10 minute, for the purpose of sterilization. During the sterilization procedure, no deformation or rupture of the container occurred.

After the sterilization procedure was completed, the container was rapidly cooled with cold water.

The sealed container containing the potato pieces was allowed to stand at ambient temperature for six months. No change in the colors of the water and the potato pieces was observed. Also, no change was found in the appearance of the container. These results suggested that the potato and water were completely sterilized in accordance with the process of the present invention.

Comparative Example 1

The same procedures as those mentioned in the Example were carried out, except that cold water having a temperature of 25° C. was used in place of the hot water, and the application of the microwaves was continued for 210 seconds until the temperatures of the water and the center portion of each potato piece reached 93° C. and 92° C., respectively.

During the sterilizing procedure, the container was bulged out.

Comparative Example 2

The same procedures as those mentioned in the Example were carried out, except that the sterilizing procedure was omitted. After the sealed container was stored for 6 months, it was found that the lid of the container was bulged upward. These phenomena indicate that the omission of the sterilizing procedure results in bacterial degeneration of the potato and water in the container.

I claim:

1. A sterilizing process for a food mixture by applying microwaves thereto, comprising the sequential steps of:
    placing a solid food material into a container which is capable of transmitting microwaves therethrough; then
    feeding a liquid material having an elevated temperature close to the temperature that said mixture is to be heated to and 80° C. to 100° C. higher than that of said solid food material into said container; whereby said container is completely filled with the mixture of said solid and liquid food materials;
    hermetically sealing said container before said mixture of said solid and liquid food materials reaches an equilibrium temperature thereof to thereby allow for some contraction on cooling before applying the next step; and
    applying microwaves under ambient pressure to said container before said mixture reaches an equilibrium temperature to raise the temperature of the mixture of said solid and said liquid materials in said sealed container to a sterilizing temperature of from 70° to 105° C., whereby said mixture becomes sterilized without damage to said container.

2. A process as claimed in claim 1, wherein said container is made of at least one material selected from the group consisting of paper, thermoplastic polymer materials and glasses.

3. A process as claimed in claim 1, wherein said container is made of a lamination of at least two members selected from the group consisting of paper sheets and thermoplastic polymer films.

4. A process as claimed in claim 1, wherein said solid food material contains 50% by weight or more of at least one liquid component.

5. A process as claimed in claim 4, wherein said solid food material containing said liquid component is a fruit, vegetable or meat.

6. A process as claimed in claim 1, wherein said liquid material contains at least one member selected from water, oils and aqueous solutions of seasoning matters.

7. A process as claimed in claim 1, wherein said microwaves have a frequency of from 900 to 10,000 MHz.

* * * * *